United States Patent
Molnar

(10) Patent No.: US 7,703,285 B2
(45) Date of Patent: Apr. 27, 2010

(54) SYSTEM AND METHOD FOR GENERATING ELECTRICITY FROM SUPER CRITICAL WATER OXIDATION PROCESS

(75) Inventor: Christopher J Molnar, Coraopolis, PA (US)

(73) Assignee: Chromalox, Inc., Pittsburgh, PA (US)

( * ) Notice: Subject to any disclaimer, the term of this patent is extended or adjusted under 35 U.S.C. 154(b) by 384 days.

(21) Appl. No.: 11/728,653

(22) Filed: Mar. 27, 2007

(65) Prior Publication Data

US 2008/0236132 A1 Oct. 2, 2008

(51) Int. Cl.
   F01K 23/06 (2006.01)
   F01K 13/00 (2006.01)
   C02F 1/68 (2006.01)
(52) U.S. Cl. ............... 60/670; 60/645; 210/761; 210/765
(58) Field of Classification Search ......... 60/647–649, 60/670, 671, 674; 210/758, 761, 765
   See application file for complete search history.

(56) References Cited

U.S. PATENT DOCUMENTS

| | | | | |
|---|---|---|---|---|
| 5,252,224 A | * | 10/1993 | Modell et al. ............ | 210/695 |
| 5,384,051 A | * | 1/1995 | McGinness ............... | 210/761 |
| 5,433,868 A | * | 7/1995 | Fassbender ............... | 210/761 |
| 5,543,057 A | * | 8/1996 | Whiting et al. ........... | 210/721 |
| 5,558,783 A | * | 9/1996 | McGuinness ............. | 210/761 |
| 5,723,045 A | * | 3/1998 | Daman .................... | 210/175 |
| 5,888,389 A | * | 3/1999 | Griffith et al. ........... | 210/175 |
| 6,031,972 A | * | 2/2000 | Barker .................... | 392/478 |
| 6,321,540 B1 | | 11/2001 | Miyoshi et al. | |
| 6,467,273 B1 | | 10/2002 | Lott et al. | |
| 6,519,926 B2 | * | 2/2003 | Hazlebeck ............... | 60/39.12 |
| 6,951,106 B2 | | 10/2005 | Raiko | |
| 7,017,347 B1 | | 3/2006 | Pierce, Jr. | |

* cited by examiner

*Primary Examiner*—Thomas E Denion
*Assistant Examiner*—Christopher Jetton
(74) *Attorney, Agent, or Firm*—K&L Gates LLP

(57) ABSTRACT

Systems and method for generating electricity using heat from a SCWO reaction. The system may comprise a pump that pumps the mixture undergoing the SCWO reaction to a pressure above the critical pressure point for the mixture. The pressurized mixture is heated, by a heating system, above the critical temperature point for the mixture. The SCWO reaction occurs in a reaction chamber. The reaction chamber is in thermal communication with a vessel that holds water such that the heat from the mixture heats the water into steam. The steam powers a steam turbine, which is connected to an electrical generator to thereby generate electricity.

10 Claims, 3 Drawing Sheets

SYSTEM AND METHOD FOR GENERATING ELECTRICITY FROM SUPER CRITICAL WATER OXIDATION PROCESS

BACKGROUND

Supercritical water oxidation (or "SCWO") is a process that occurs in water at temperatures and pressures above a mixture's thermodynamic critical point. Under these conditions water becomes a fluid with unique properties that can be used to advantage in the destruction of hazardous wastes such as PCBs or other organic materials. The fluid has a density between that of water vapor and liquid at standard conditions, and exhibits high gas-like diffusion rates along with high liquid-like collision rates. In addition, solubility behavior is reversed so that chlorinated hydrocarbons become soluble in the water, allowing single-phase reaction of aqueous waste with a dissolved oxidizer. The reversed solubility also causes salts to precipitate out of solution, meaning they can be treated using conventional methods for solid-waste residuals.

SUMMARY

In one general aspect, the present invention is directed to systems and method for generating electricity using heat from a SCWO reaction. According to various embodiments, the system comprises a pump that pumps the mixture undergoing the SCWO reaction to a pressure above the critical pressure point for the mixture. The mixture comprises an organic substance, such as glycerin, although other organic substances could also be used. The mixture may also comprise water and an oxidizer. The pressurized mixture is heated, by a heating system, above the critical temperature point for the mixture. The SCWO reaction occurs in a reaction chamber. The reaction chamber is in thermal communication with a vessel that holds water such that the heat from the mixture heats the water into steam. The steam powers a steam turbine, which is connected to an electrical generator to thereby generate electricity.

According to various implementations, the heating system may comprise an impedance heating system. Also, the system may further comprise a second pump for pumping water from condensed steam from the steam turbine back to the vessel for reheating. In addition, the system may further comprise a third pump for pumping water that is a byproduct of the SCWO reaction back to the beginning of the system so that it can be combined with the organic substance in the mixture that is subject to the SCWO reaction. Any excess water can be used for other purposes.

Embodiments of the present invention are therefore capable of providing an efficient means of destruction, combusting, or decomposing organic materials (such as hazardous organic materials) and, in conjunction, means for generating electricity from the heat used in the reaction to destruct the organic material. These and other benefits of the present invention will be apparent from the description to follow.

FIGURES

Various embodiments of the present invention are described herein by way of example in conjunction with the following figures wherein.

DETAILED DESCRIPTION

Figure 1:
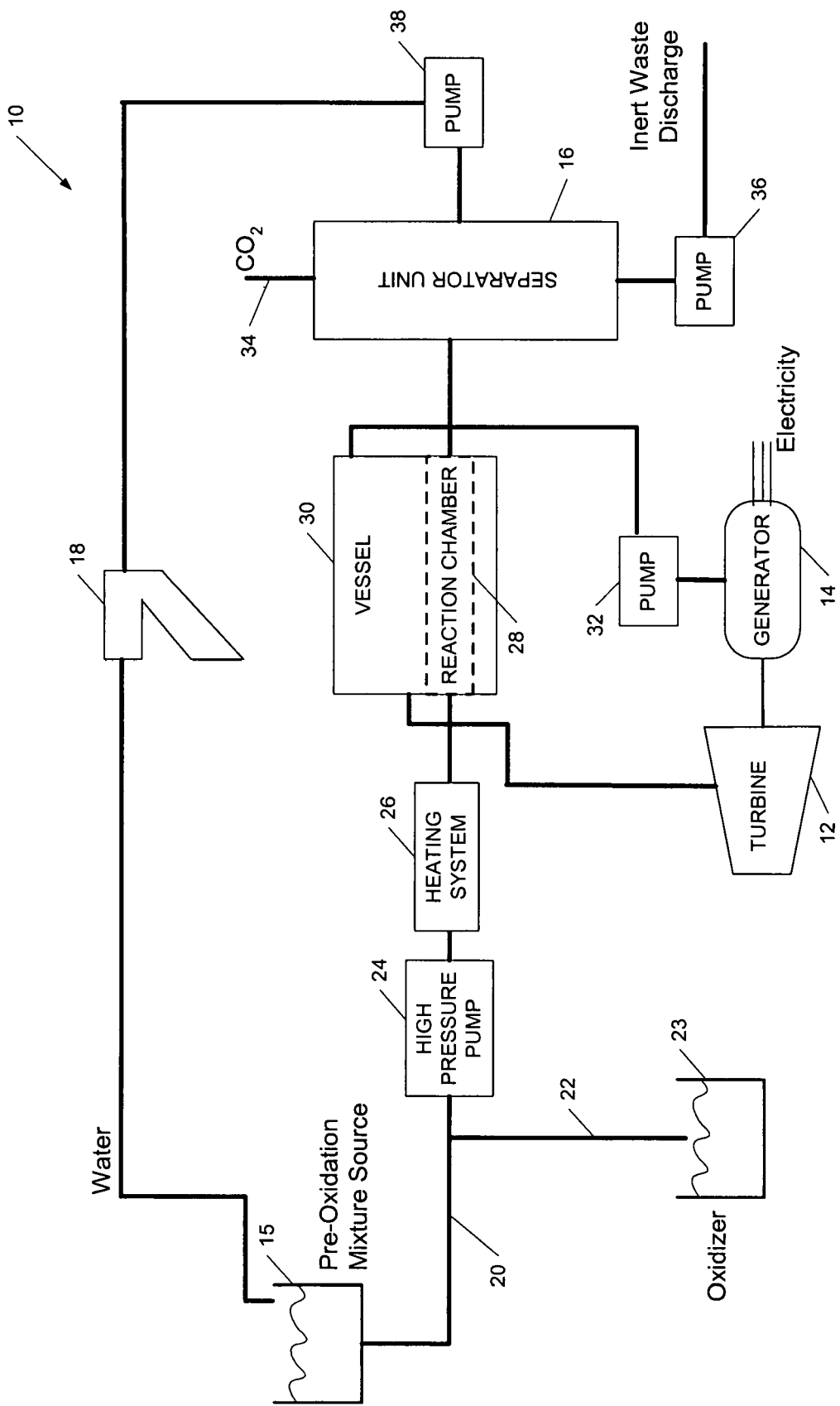
FIG. 1 is a diagram of a system according to various embodiments of the present invention.

FIG. 1 is a diagram of a system 10 for generating electricity according to various embodiments of the present invention. As described in more detail below, the system 10 may decompose a mixture using a supercritical water oxidation (SCWO) process. The heat generated from the SCWO process is used to heat water, which generates steam. The steam powers a steam-driven turbine 12, which powers an electrical generator 14 to produce electricity. The system 10 is generally described below as using the SCWO process to decompose a mixture comprising glycerin, but the mixture could comprise other organic materials. When the mixture comprises glycerin, the resulting chemical reaction due to the SCWO process is:

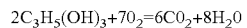
$$2C_3H_5(OH)_3 + 7O_2 = 6CO_2 + 8H_2O$$

A separator unit 16 may release the $CO_2$ gas and solid particulates from the reaction for disposal. The remaining water from the reaction may be filter and cleaned by a filter 18 and returned back to the beginning of the system for mixture with the glycerin.

The SCWO process requires a fuel mixture comprising an organic material (e.g., an organic waste), water and an oxidizer. According to various embodiments, the organic material may be glycerin. As such, a mixture of glycerin and water, stored in a pre-oxidation mixture source 15, may be pumped into or otherwise enter a conduit 20. The oxidizer (e.g., oxygen or air) may be added via the conduit 22 from an oxidizer source 23. The glycerin-water-oxidizer fuel mixture is then pumped by a high pressure pump 24 to or above the necessary pressure for the mixture for the SCWO process, e.g., approximately 3200 psi. The pressurized mixture is then heated to or above its supercritical temperature (approximately 1050° F.) by a heating system 26.

The SCWO reaction occurs in a reaction chamber 28 when the mixture is at supercritical conditions (or its supercritical state). Supercritical conditions are a temperature (i.e., critical temperature point) and a pressure (i.e., critical pressure point) at which the liquid state of the mixture ceases to exist. As the mixture is heated, its density decreases while the pressure and density of the vapor being formed increases. The liquid and vapor densities become closer and closer to each other until the critical temperature is reached where the two densities are equal and the liquid-gas line or phase boundary disappears. As supercritical conditions, the reactants comprise a homogenous single-phase mixture facilitating complete reaction. The reactions proceed as gas-phase free-radical reactions involving the formation of a variety of intermediary species and related subreactions as the reaction proceeds to completion. The products of the SCWO vary depending on the constituents of the starting mixture. When the mixture comprises glycerin, the products comprise water and $CO_2$ gas, as mentioned above.

The heat from the reaction is used to heat water contained in a vessel 30 in thermal communication with the reaction chamber 28 to produce high pressure steam. For example, as shown in FIG. 1, the reaction chamber 28 may be positioned inside the vessel 30 such that the heat from the mixture heats the water in the vessel 30. The steam from the heated water is carried via a conduit 31 to the steam-powered turbine 12, which powers the electrical generator 14 for producing electricity. The water produced from the condensation of the steam by the turbine 12 may be returned to the vessel 30 by a pump 32 for subsequent heating.

The post combustion fuel stream may be cooled and condensed in the reaction chamber 28 (or a separate cooler, not shown) and forwarded to the separator unit 16. The separator unit 16 may release the carbon dioxide gas (or whatever gas is produced in the reaction) via an exhaust 34. Also, solid particulates may be discharged using a pump 36. The remaining water from the reaction may be pumped by a pump 38 back to the beginning of the system 10 via a conduit 40 for mixture with the glycerin. The filter 18 may clean and filter the water. Excess water, if any, from the reaction can be used for other purposes if needed.

Figure 2:
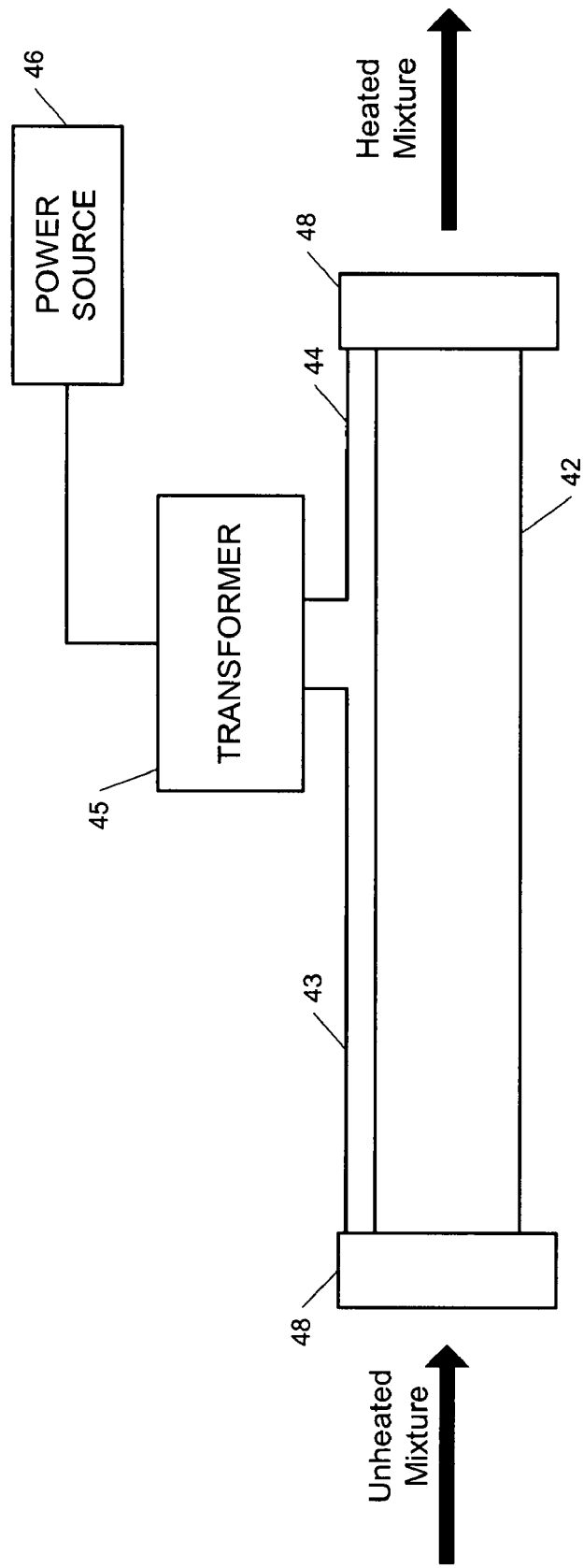
FIG. 2 is a diagram of an impedance heating system according to various embodiments of the present invention.

According to various embodiments, the heating system 26 may comprise an impedance heating system. FIG. 2 shows an embodiment of an impedance heating system 26 according to various embodiments. A conduit 42 carries the fuel mixture for heating. The conduit 42 may be made of an electrically and thermally conductive material that has an electrical impedance, such as steel, iron, copper, etc. A low voltage current is applied to each end of the conduit 42 by power cables 43, 44 that carry the low voltage current from a transformer 44 and a power source 46. The conduit 42 may include terminal plates 47 to which the power cables 43, 44 are connected, as shown in FIG. 2.

The conduit 42 conducts the low voltage current and acts, due to its impedance, as its own heating element, heating the fuel mixture flowing through the conduit 42. The conduit 42 acts as a resistor, which gives off heat when conducting electricity. The resistance of the conduit 42 depends on its length, composition, and wall thickness. In addition, the current flow through the power cables 43, 44 may set up a magnetic field around the cables 43, 44. If the conduit 42 is made of a magnetic material, such as steel, the magnetic field interacts with the conduit 42, producing a skin effect in the conduit 42, which also produces heat for heating the mixture flowing through the conduit 42. Also, the power source 46 may supply an alternating current (e.g., 60 Hz). The electrical inertia of the conduit 42 relative to the changing magnetic field caused by the alternating current produces a hysteresis effect, which also contributes to heating the mixture carried in the conduit 42.

The voltage applied to the conduit 42 may be in the range of 1 to 80 volts, for example. The amperage may be in the range of 5 to 2500 A, for example. A control panel (not shown) may be used to control the power supplied to the conduit 42. A sensor, such as a thermocouple (not shown), connected to the conduit 42 may provide feedback to the control panel regarding the temperature of the conduit 42.

The conduit 42 may be electrically insulted from the remainder of the conduit 20 that is used carry the fuel mixture to the reaction chamber 28 so that only the portion (the conduit 42) that is being used as the heating element to heat the mixture conducts the electrical current. Also, the conduit 42 may be insulated.

Figure 3:
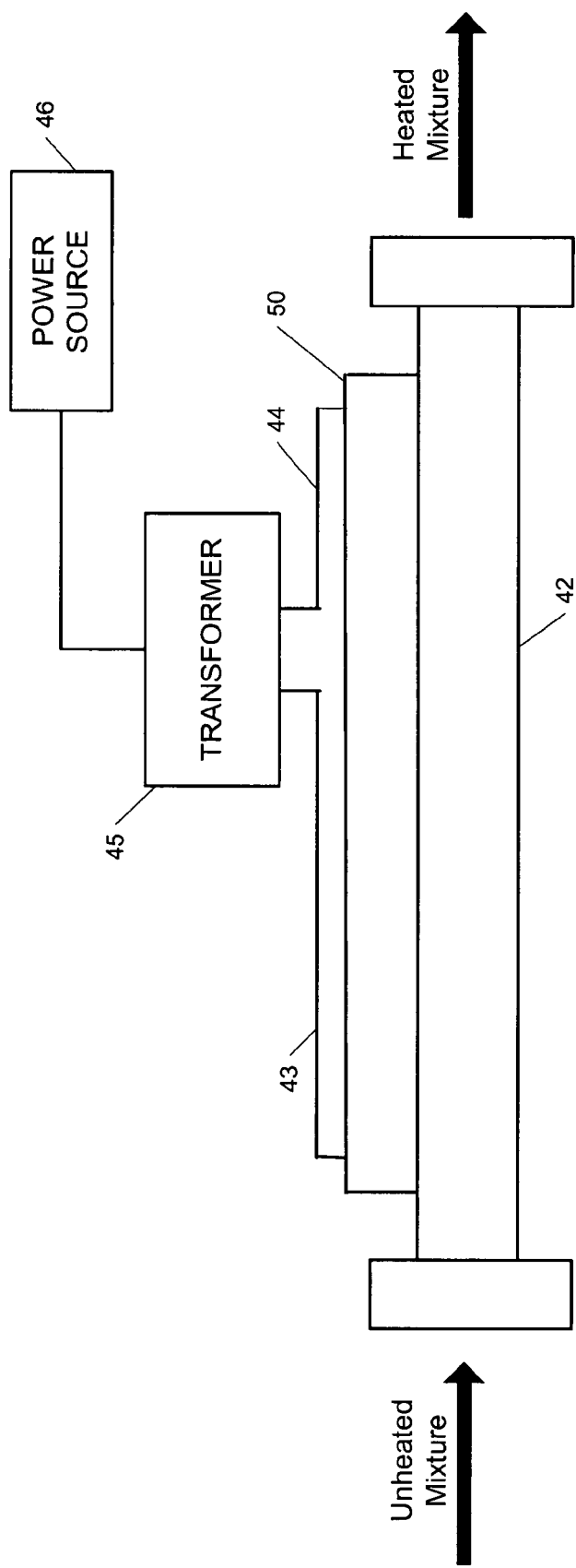
FIG. 3 is a diagram of an impedance heating system according to other various embodiments of the present invention.

FIG. 3 is a diagram of an impedance heating system according to other embodiments of the present invention. In the illustrated embodiment, the conduit 42 carries the fuel mixture to the reaction chamber 28. The conduit 42 is in close thermal communication with a second conduit 50, which does not carry the fuel mixture, but which carries the low voltage current. In this arrangement, the second conduit 50 acts as the heating element, heating the first conduit 42, which heats the fuel mixture carried therein. The second conduit 50 is preferably made of an electrically and thermally conductive material, such as such as steel, iron, copper, etc. The first conduit 42 is preferably made of a material that can conduct the heat from the second conduit 50 to the mixture flowing through the first conduit 42, such as such as steel, iron, copper, etc.

Other types of heating systems for the heating system 26 may also be used. For example, the heating system 26 could comprise an immersion heater or a circulation heater.

Also, the system 10 could be used for other types of fuel mixtures besides ones containing glycerin. Most any organic substance could be used, including, but are not limited to: solid organic wastes; organic refuse streams; cellulose; methane; benzene; diaxin (PCDD); chloroform; TNT; Ferrous Chloride; and PCBs. The pressures and temperatures necessary to carry out the SCWO reactions for these substances may vary. Also, different oxidizers may be advantageously used besides air or oxygen, such as hydrogen peroxide, for example. Also, such mixtures may produce output gases different from $CO_2$, depending on the composition of the mixture. The separator unit 16 may configured to separate and release whatever gas is produced by the SCWO reaction.

While several embodiments of the present invention have been described herein, it should be apparent that various modifications, alterations and adaptations to those embodiments may occur to persons skilled in the art. It is therefore intended to cover all such modifications, alterations and adaptations without departing from the scope and spirit of the present invention as defined by the appended claims.

What is claimed is:

1. A system comprising:
    a first pump for pumping a mixture stored in a mixture source, the mixture comprising an organic substance and water, the mixture having a critical pressure point and a critical temperature point, wherein the first pump elevates the pressure of the mixture above the critical pressure point for the mixture;
    an impedance heating system connected to the first pump for heating the mixture above the critical temperature point for the mixture, wherein the impedance heating system comprises a conduit and wherein the impedance heating system heats the mixture as the mixture flows through the conduit;
    a reaction chamber connected to the heating system where a supercritical water oxidation (SCWO) reaction of the mixture occurs, wherein by-product water is a product of the SCWO reaction;
    a vessel holding water in thermal communication with the reaction chamber so that heat from the SCWO reaction heats the water into steam;
    a steam turbine connected to the vessel for receiving the steam generated by heating of the water in the vessel with the heat from the SCWO reaction;
    an electrical generator connected to the steam turbine;
    a separator unit connected to the reaction chamber that separates gas produced by the SCWO reaction from the by-product water that produced by the SCWO reaction; and
    a second pump connected to the separator unit for pumping the by-product water that is produced by the SCWO reaction to the mixture source that contains the organic substance and the water that is pumped by the first pump.

2. The system of claim 1, an oxidizer source that adds an oxidizer to the mixture prior to being pressurized by the first pump.

3. The system of claim 2, wherein the organic substance comprises glycerin.

4. The system of claim 2, wherein the impedance heating system comprises:
    a source of electrical power;
    the conduit for carrying the mixture; and one or more power cables for coupling the electrical power to the conduit so that the conducts current, thereby heating the mixture carried in the conduit.

5. The system of claim 2, further comprising a third pump for pumping water from condensed steam from the steam turbine to the vessel.

6. A method comprising:
pumping a mixture comprising an organic substance and water to a pressure above a critical pressure point for the mixture;
heating the pressurized mixture as the pressurized mixture flows through a conduit of an impendence heating system, wherein the pressurized mixture is heated above a critical temperature point for the mixture such that the mixture undergoes a SCWO reaction, wherein by-product water is a product of the SCWO reaction;
heating water in a vessel with heat from the SCWO reaction so that steam is generated;
powering a steam turbine with the steam generated by heating of the water in the vessel with the heat from the SCWO reaction;
powering an electrical generator with the steam turbine;
separating gas produced by the SCWO reaction from by-product water produced by the SCWO reaction; and
pumping the by-product water produced by the SCWO reaction to the mixture source.

7. The method of claim 6, further comprising adding an oxidizer to the mixture prior to pumping the mixture to the pressure above the critical pressure point of the mixture.

8. The method of claim 7, wherein the organic substance comprises glycerin.

9. The method of claim 8, wherein heating the pressurized mixture with the impedance heating system comprises applying an electrical current to the conduit carrying the mixture, wherein the conduit has an impedance such that the conduit acts as a heating element for the pressurized mixture.

10. The method of claim 8, further comprising pumping water from condensed steam from the steam turbine to the vessel.

* * * * *